United States Patent
Coady et al.

(10) Patent No.: US 11,556,835 B1
(45) Date of Patent: Jan. 17, 2023

(54) DISTRIBUTED QUANTUM COMPUTING SYSTEMS

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/537,014

(22) Filed: Nov. 29, 2021

(51) Int. Cl.
  *G06F 15/16* (2006.01)
  *G06N 10/40* (2022.01)
  *H04L 67/10* (2022.01)
  *G06N 10/80* (2022.01)

(52) U.S. Cl.
  CPC .......... *G06N 10/40* (2022.01); *G06N 10/80* (2022.01); *H04L 67/10* (2013.01)

(58) Field of Classification Search
  CPC ............................... G06N 10/40; H04L 67/10
  See application file for complete search history.

(56) References Cited

U.S. PATENT DOCUMENTS

| | | | |
|---|---|---|---|
| 7,875,876 | B1 | 1/2011 | Wandzura et al. |
| 9,858,531 | B1 | 1/2018 | Monroe et al. |
| 9,953,269 | B2 | 4/2018 | Chow et al. |
| 2018/0260730 | A1 | 9/2018 | Reagor et al. |
| 2021/0174237 | A1* | 6/2021 | Mentovich .............. G06N 10/00 |
| 2021/0357186 | A1* | 11/2021 | Griffin .................... G06F 8/316 |
| 2022/0222567 | A1* | 7/2022 | Reagor ................... H01L 39/14 |

FOREIGN PATENT DOCUMENTS

EP   3807825 A2   4/2021

OTHER PUBLICATIONS

Isailovic, N. et al., "Interconnection Networks for Scalable Quantum Computers," ACM SIGARCH Computer Architecture News, vol. 34, Issue 2, May 2006, 12 pages.
Monroe, C. et al., "Large-scale modular quantum-computer architecture with atomic memory and photonic interconnects," Physical Review A, vol. 89, Feb. 13, 2014, American Physical Society, 16 pages.
Sargaran, S. et al., "SAQIP: A Scalable Architecture for Quantuminformation Processors," ACM Transactions on Architecture and Code Optimization, vol. 16, No. 2, Article 12, Apr. 2019, ACM, 9 pages.

* cited by examiner

*Primary Examiner* — Hua Fan
(74) *Attorney, Agent, or Firm* — Dority & Manning, P.A.

(57) ABSTRACT

It is determined that a first quantum process is to be initiated and will utilize a first quantity of qubits. Quantum computing system (QCS) metadata is accessed that identifies a plurality of QCSs and, for each respective QCS in the plurality of QCSs, a plurality of qubits implemented by the respective QCS. Based on the QCS metadata, a set of QCSs from the plurality of QCSs is selected to form a first distributed QCS. A set of qubits implemented by the QCSs in the set of QCSs is selected. Distributed QCS information is sent to each QCS in the set of QCSs, the distributed QCS information identifying one QCS in the set of QCSs as a primary QCS.

20 Claims, 8 Drawing Sheets

DISTRIBUTED QUANTUM COMPUTING SYSTEMS

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement distributed quantum computing systems.

In one example a method is provided. The method includes determining, by a computing device, that a first quantum process is to be initiated and will utilize a first quantity of qubits. The method further includes accessing quantum computing system (QCS) metadata that identifies a plurality of QCSs and, for each respective QCS in the plurality of QCSs, a plurality of qubits implemented by the respective QCS. The method further includes selecting, to form a first distributed QCS, a first set of QCSs from the plurality of QCSs based on the QCS metadata. The method further includes selecting a first set of qubits implemented by the QCSs in the first set of QCSs. The method further includes sending first distributed QCS information to each QCS in the first set of QCSs, the first distributed QCS information identifying one QCS in the first set of QCSs as a first primary QCS.

In another example a computing device is provided. The computing device includes a memory and a processor device coupled to the memory. The processor device is to determine that a first quantum process is to be initiated and will utilize a first quantity of qubits. The processor device is further to access QCS metadata that identifies a plurality of QCSs and, for each respective QCS in the plurality of QCSs, a plurality of qubits implemented by the respective QCS. The processor device is further to select, to form a first distributed QCS, a first set of QCSs from the plurality of QCSs based on the QCS metadata. The processor device is further to select a first set of qubits implemented by the QCSs in the first set of QCSs. The processor device is further to send first distributed QCS information to each QCS in the first set of QCSs, the first distributed QCS information identifying one QCS in the first set of QCSs as a first primary QCS.

In another example a non-transitory computer-readable storage medium is provided. The non-transitory computer-readable storage medium includes executable instructions to cause a processor device to determine that a first quantum process is to be initiated and will utilize a first quantity of qubits. The instructions further cause the processor device to access QCS metadata that identifies a plurality of QCSs and, for each respective QCS in the plurality of QCSs, a plurality of qubits implemented by the respective QCS. The instructions further cause the processor device to select, to form a first distributed QCS, a first set of QCSs from the plurality of QCSs based on the QCS metadata. The instructions further cause the processor device to select a first set of qubits implemented by the QCSs in the first set of QCSs. The instructions further cause the processor device to send first distributed QCS information to each QCS in the first set of QCSs, the first distributed QCS information identifying one QCS in the first set of QCSs as a first primary QCS.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources, but as the technology evolves, quantum computing systems (QCSs) are implementing larger and larger numbers of qubits. As quantum computing continues to increase in popularity and become more commonplace, it will be increasingly important to efficiently utilize qubits that are implemented by multiple QCSs. One mechanism for increasing the efficient use of qubits is to facilitate qubit utilization across multiple QCSs in a way that is completely or substantially transparent to a quantum process using the qubits, and in a way that ensures coordination among the QCSs.

The examples disclosed herein implement distributed QCSs. Qubit metadata is maintained that identifies the qubits implemented by a plurality of interconnected QCSs. A request is made for a quantity of qubits, and the qubit metadata is accessed to determine a set of QCSs that collectively implement the quantity of qubits to form a distributed quantum computing system. One QCS in the set of QCSs is selected to be the primary QCS. Information is sent to each of the QCSs that identifies the primary QCS and the qubits on each QCS that will be used to form the distributed QCS. A quantum process can then be initiated on the primary QCS and have access to each qubit in the distributed QCS without concern that the qubits on the QCSs that form the distributed QCS may be allocated to other quantum processes.

Figure 1A:
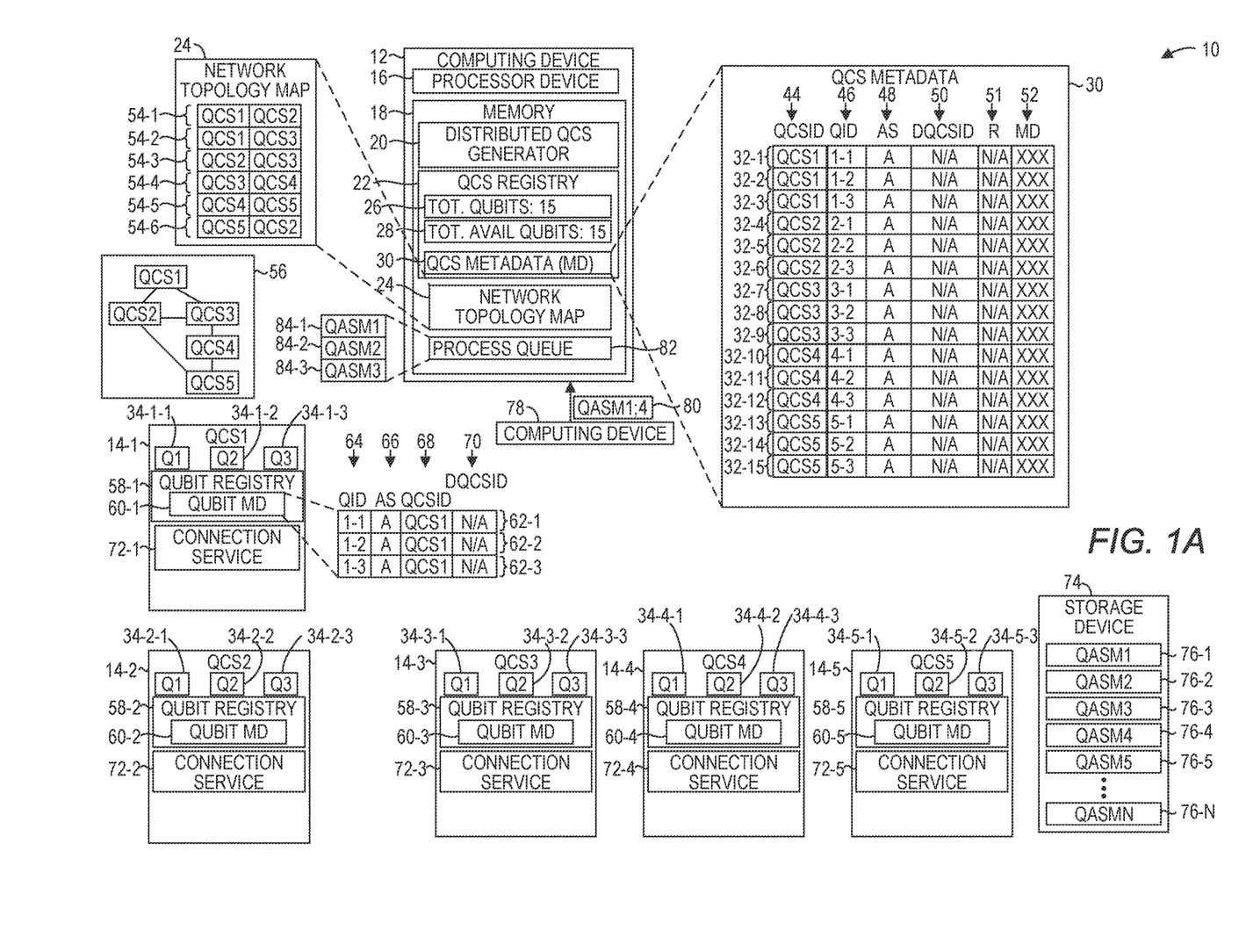
FIGS. 1A-1B are block diagrams of an environment, at successive points in time, in which the implementation of distributed quantum computing systems (QCSs) can be practiced according to one implementation.
Figure 1B:
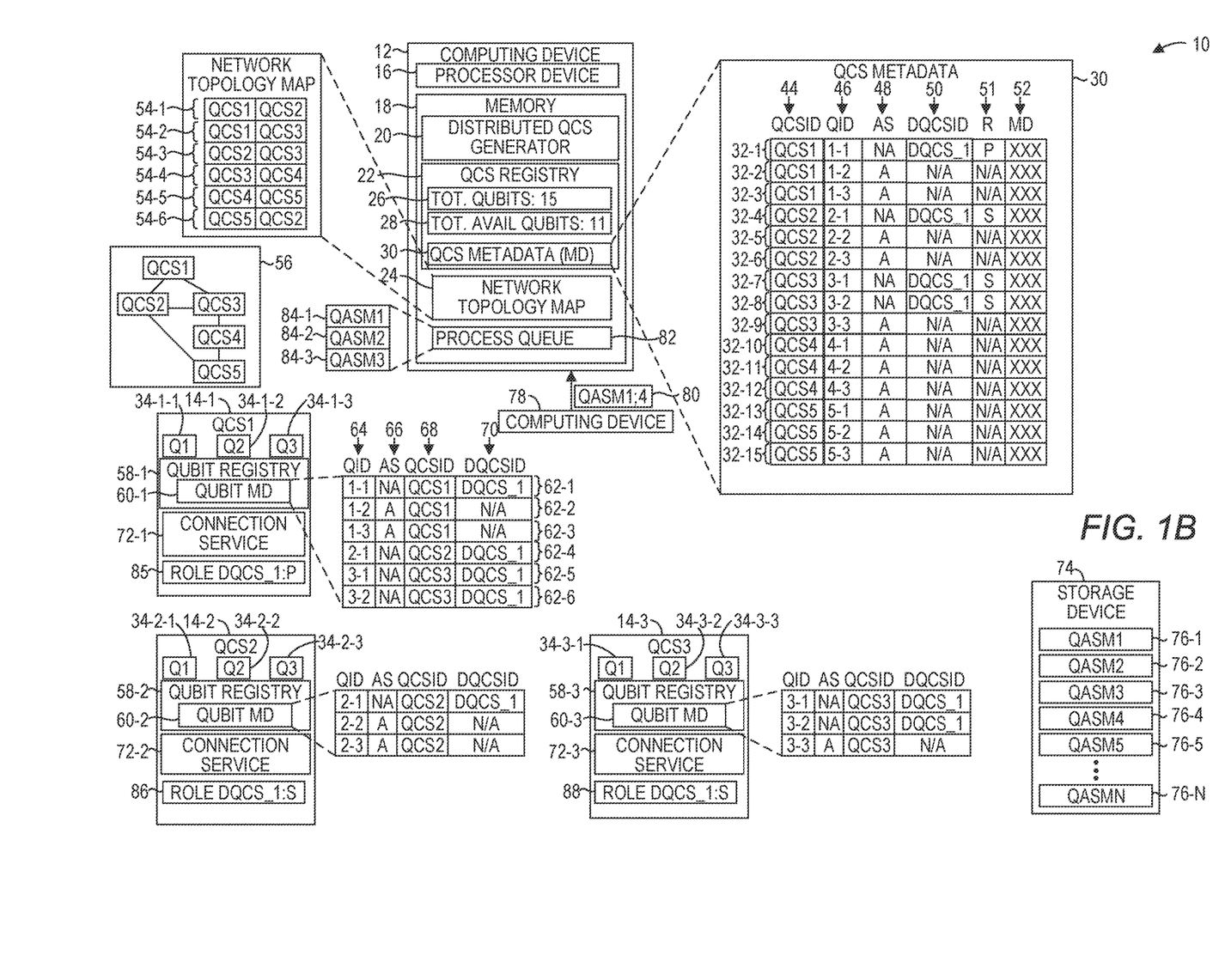

FIGS. 1A-1B are block diagrams of an environment 10, at successive points in time, in which the implementation of distributed QCSs can be practiced according to one implementation. Referring first to FIG. 1A, the environment includes a computing device 12 and a plurality of QCSs 14-1-14-5 (generally, QCSs 14). The QCSs 14 operate in quantum environments but can operate using classical computing principles or quantum computing principles. When using quantum computing principles, the QCSs 14 perform computations that utilize quantum-mechanical phenomena, such as superposition and entanglement. The QCSs 14 may operate under certain environmental conditions, such as at or near 0° Kelvin. When using classical computing principles, the QCSs 14 utilize binary digits that have a value of either 1 or 0. The QCSs 14 may be geographically proximate to one another, or may be geographically remote from one another, such as hundreds or thousands of miles from one another.

The computing device 12 includes a processor device 16 and a memory 18. The memory 18 includes a distributed QCS generator 20. The distributed QCS generator 20 maintains information suitable for forming distributed QCSs, including, by way of non-limiting example, a QCS registry 22 and a network topology map 24. The QCS registry 22 maintains information about the QCSs 14 and the plurality of qubits implemented by the QCSs 14. Solely for purposes of simplicity and illustration, in this example each QCS 14 implements three qubits. However, it is noted that, in practice, a QCS 14 may have tens, hundreds or thousands of qubits. The QCS registry 22 includes a total qubits counter 26 that identifies the total number of qubits implemented by the QCSs 14, and a total available qubits counter 28 that maintains count of the total number of qubits that are currently available for allocation. At the point in time illustrated in FIG. 1A, all 15 qubits implemented by the QCSs 14 are available.

The QCS registry 22 maintains QCS metadata 30, which comprises a plurality of metadata records 32-1-32-15 (generally, metadata records 32), each of which maintains information about a corresponding qubit implemented by a QCS 14-1-14-5. Metadata records 32-1-32-3 correspond to and maintain information about qubits 34-1-1-34-1-3 implemented by the QCS 14-1. Metadata records 32-4-32-6 correspond to and maintain information about qubits 34-2-1-34-2-3 implemented by the QCS 14-2. Metadata records 32-7-32-9 correspond to and maintain information about qubits 34-3-1-34-3-3 implemented by the QCS 14-3. Metadata records 32-10-32-12 correspond to and maintain information about qubits 34-4-1-34-4-3 implemented by the QCS 14-4. Metadata records 32-13-32-15 correspond to and maintain information about qubits 34-5-1-34-5-3 implemented by the QCS 14-5. The qubits 34-1-1-34-5-3 may be referred to generally as the qubits 34.

Each metadata record 32 includes a QCS identifier (QCSID) 44 that identifies the QCS 14 that implements the qubit 34 that corresponds to the respective metadata record 32. Each metadata record 32 includes a qubit identifier (QID) 46 that contains an identifier of the qubit 34 to which the respective metadata record 32 corresponds, an availability status (AS) 48 that identifies whether the corresponding qubit 34 is available for allocation, and a distributed QCS ID (DQCSID) 50 that identifies the distributed QCS to which the corresponding qubit 34 has been allocated. Each metadata record 32 may also include a role (R) 51 that identifies the role of the QCS 14 that implements the corresponding qubit 34 in a distributed QCS to which the qubit 34 has been allocated, and additional metadata 52, such as metadata indicating a real-time state of the corresponding qubit 34, such as whether the qubit 34 is in an entangled state, is in superposition, or metadata that describes characteristics of the corresponding qubit 34, such as the type of qubit 34, the type of environment in which the qubit 34 is implemented, or the like.

The network topology map 24 contains information that identifies connections between pairs of the plurality of QCSs 14. In this example, the network topology map 24 contains a plurality of entries 54-1-54-6. The entry 54-1 identifies a connection between the QCS 14-1 and the QCS 14-2; the entry 54-2 identifies a connection between the QCS 14-1 and the QCS 14-3; the entry 54-3 identifies a connection between the QCS 14-2 and the QCS 14-3; the entry 54-4 identifies a connection between the QCS 14-3 and the QCS 14-4; the entry 54-5 identifies a connection between the QCS 14-4 and the QCS 14-5; and the entry 54-6 identifies a connection between the QCS 14-5 and the QCS 14-2.

The connections may comprise any type of communications channel, such as a fiber communications channel, a wireless communications channel, or the like. In some implementations, the connections are quantum communications channels that can convey quantum information between QCSs 14. For purposes of illustration, FIG. 1 includes an inset 56 that illustrates the topology of the QCSs 14 based on the network topology map 24. The inset 56 visually indicates that the QCS 14-1 is directly connected to the QCSs 14-2 and 14-3, the QCS 14-2 is directly connected to the QCSs 14-1, 14-3 and 14-5, the QCS 14-3 is directly connected to the QCSs 14-1, 14-2 and 14-4, the QCS 14-4 is directly connected to the QCSs 14-3 and 14-5, and the QCS 14-5 is directly connected to the QCSs 14-4 and 14-2.

The QCSs 14-1-14-5 maintain qubit registries 58-1-58-5, which include qubit metadata 60-1-60-5, each of which maintains information about the qubits 34 implemented by the respective QCS 14-1-14-5. At the point in time illustrated in FIG. 1A, all of the qubits 34 are available for allocation. The qubit metadata 60-1 includes entries 62-1-62-3 which correspond, respectively, to the qubits 34-1-1-34-1-3 implemented by the QCS 14-1. Each entry 62 includes a qubit identifier (QID) 64 that contains an identifier of the qubit 34 to which the respective entry 62 corresponds, an availability status (AS) 66 that identifies whether the corresponding qubit 34 is available for allocation, a QCS identifier (QCSID) 68 that identifies the QCS 14 that implements the qubit 34, and a distributed QCS identifier (DQCSID) 70 that identifies the distributed QCS to which the corresponding qubit 34 has been allocated, if any.

The qubit metadata 60-2-60-5, while not illustrated in detail, contain similar information about the qubits 34 implemented by the corresponding QCSs 14-2-14-5. The QCSs 14-1-14-5 each contain a respective connection service 72-1-72-5 that operates to establish, upon request, connections with other QCSs 14-1-14-5. As will be described in greater detail below, in conjunction with the establishment of a distributed QCS, the connection services 72 may alter, for example, firewall or other security rules to allow communications between QCSs 14-1-14-5 that would otherwise not be permitted, and may implement any suitable signaling between QCSs 14-1-14-5 to either implement a connection or keep a connection active, such as, by way of non-limiting example, keep-alive pings, or the like. Upon termination of a distributed QCS, the connection services 72 may restore any firewall or security rules. While for purposes of illustration only one connection service 72 is illustrated for each QCS 14, in practice a separate connection service 72 may be implemented for each separate connection with another QCS 14.

The environment 10 includes a storage device 74 on which one or more quantum assembly language (QASM) files 76-1-76-N (generally, QASM files 76) are stored. Each QASM file 76 includes quantum programming instructions that implement a desired functionality in a quantum process initiated from the QASM file 76.

The distributed QCS generator 20 operates to establish a distributed QCS among selected QCSs 14. The distributed QCS includes a QCS 14 that is designated as the controlling, or primary, QCS 14 and one or more secondary QCSs 14. Once established, a quantum process can be initiated on the primary QCS 14 and has access to a desired quantity of qubits 34 that are spread across the QCSs 14 that compose the distributed QCS. As an example, assume that the distributed QCS generator 20 determines that a quantum process is to execute and will utilize four qubits 34. This determination may be made in any number of ways. In one example, a requestor, such as a computing device 78 may send a request 80 that identifies a quantum process and the number of qubits that will be utilized. In this example, the request 80 identifies the quantum process via the QASM file 76-1 from which the quantum process will be initiated and indicates that the quantum process will utilize four qubits 34. In some examples, the distributed QCS generator 20 may determine the quantity of qubits 34 that will be utilized by the quantum process by determining the QASM file 76 that implements the quantum process and analyzing the programming instructions in the QASM file to determine the quantity of qubits 34 to be utilized by the quantum process.

In another implementation, the distributed QCS generator 20 may determine that a quantum process is to execute via a process queue 82 of requests from requestors to execute quantum processes. In this example, the process queue 82 contains three requests 84-1-84-3, wherein the first request was the request 84-1, the second request was the request 84-2, and the third request was the request 84-3. The requests 84 may identify the QASM file 76 that implements the corresponding quantum process to be initiated and may identify the number of qubits 34 that will be utilized by the quantum process, or as discussed above, the distributed QCS generator 20 may determine the quantity of qubits 34 that will be utilized by the quantum process by analyzing the programming instructions in the QASM file 76 identified in the request.

After the distributed QCS generator 20 determines that a quantum process is to be initiated, the distributed QCS generator 20 accesses the QCS metadata 30. The distributed QCS generator 20 selects a set of QCSs 14 to form a distributed QCS, and a set of qubits 34 implemented by the set of QCSs 14. The selection of the QCSs 14 and the particular qubits 34 may be based on any of a number of criteria. The selection of the QCSs 14 may be based on a number of available qubits 34 implemented by the QCSs 14 and a current load of the QCSs 14, and in particular, less loaded QCSs 14 may be selected over greater loaded QCSs 14. The distributed QCS generator 20 may also select the QCSs 14 based on topology information maintained in the network topology map 24. For example, the distributed QCS generator 20 may determine that it is more desirable, if possible, to select QCSs 14 that are all connected to one another to form a distributed QCS. The network topology map 24 may also identify types of connections between QCSs 14, such as fiber, wireless, satellite, or the like, and the distributed QCS generator 20 may also base the selection of the QCSs 14 on the types of connections. In some implementations, the distributed QCS generator 20 may select the particular qubits 34 based on characteristics of the qubits 34 and metadata contained in the request. For example, the request may identify characteristics of qubits 34 to be utilized, such as qubits 34 that operate in certain environmental conditions or the like.

In this example, the distributed QCS generator 20 selects the QCSs 14-1-14-3 and the qubits 34-1-1, 34-2-1, 34-3-1 and 34-3-2 to form a distributed QCS DQCS_1. The distributed QCS generator 20 selects the QCS 14-1 to be the controlling, or primary, QCS 14, and the QCSs 14-2 and 14-3 to be following, or secondary, QCSs 14. The selection of the roles of the QCSs 14 in a distributed QCS 14 may be based on any desired criteria, such as current workload, the roles of the QCSs 14 in other distributed QCSs 14, or the like.

Referring now to FIG. 1B, it is first noted that elements illustrated in FIG. 1A, such as the QCSs 14-4 and 14-5 have been omitted from FIG. 1B solely due to space limitations. The distributed QCS generator 20 modifies the QCS metadata 30 to identify the QCSs 14 in the distributed QCS DQCS_1. In particular, the distributed QCS generator 20 modifies the metadata records 32-1, 32-4, 32-7 and 32-8, which correspond, respectively, to the qubits 34-1-1, 34-2-1, 34-3-1 and 34-3-2. The distributed QCS generator 20 modifies the AS 48 of the metadata records 32-1, 32-4, 32-7 and 32-8 to indicate that the qubits 34-1-1, 34-2-1, 34-3-1 and 34-3-2 are no longer available for allocation, and modifies the DQCSID 50 to indicate that the qubits 34-1-1, 34-2-1, 34-3-1 and 34-3-2 have been allocated to the distributed QCS DQCS_1. The distributed QCS generator modifies the R 51 of the metadata record 32-1 to indicate that the QCS 14-1 has a role of a primary QCS 14 and modifies the R 51 of the metadata records 32-4, 32-7 and 32-8 to indicate that the QCSs 14-2 and 14-3 have a role of secondary QCSs 14.

The distributed QCS generator 20 sends distributed QCS information to each QCS 14 in the distributed QCS DQCS_1. In particular, the distributed QCS generator 20 sends a message to the QCS 14-1 indicating that the QCS 14-1 is the controlling QCS 14 in a newly formed distributed QCS DQCS_1, and that the qubit 34-1-1 implemented by the QCS 14-1, the qubit 34-2-1 implemented by the QCS 14-2, and the qubits 34-3-1 and 34-3-2 implemented by the QCS 14-3 form the distributed QCS DQCS_1. The message may also include information regarding an identifier of the quantum process to be initiated, connection information relating to desired connections to utilize between the QCS 14-1 and the QCSs 14-2 and 14-3, authentication information necessary to establish such connections, and address/location information of the qubits 34-2-1, 34-3-1 and 34-3-2.

The QCS 14-1 receives the message and modifies the qubit metadata 60-1 to identify the qubits 34-1-1, 34-2-1, 34-3-1 and 34-3-2 as forming the distributed QCS DQCS_1. In particular, the QCS 14-1 generates entries 62-4-62-6 that correspond to the qubits 34-2-1, 34-3-1 and 34-3-2. The QCS 14-1 modifies the AS 66 of the entries 62-1, 62-4-62-6 to reflect that the corresponding qubits 34-1-1, 34-2-1, 34-3-1 and 34-3-2 are no longer available for allocation. The QCS 14-1 modifies the QCSID 68 of the entry 62-4 to reflect that the qubit 34-2-1 is implemented by the QCS 14-2, and the QCSID 68 of the entries 62-5 and 62-6 to reflect that the qubits 34-3-1 and 34-3-2 are implemented by the QCS 14-3. The QCS 14-1 modifies the DQCSID 70 to reflect that the qubits 34-1-1, 34-2-1, 34-3-1 and 34-3-2 are now part of the distributed QCS DQCS_1. The QCS 14-1 generates role data 85 that indicates that the QCS 14-1 is the primary QCS 14 in the distributed QCS DQCS_1.

The connection service 72-1 performs certain process to facilitate connections with the QCSs 14-2 and 14-3. Physical connections between the QCSs 14-1, 14-2 and 14-3 may already exist, but may be inactive due to firewall rules and/or router rules. The connection service 72-1 may modify firewall rules and routing rules and perform any other processing suitable to allow communications associated with the distributed QCS DQCS_1 between the QCSs 14-1, 14-2 and 14-3. The QCSs 14-2 and 14-3, in turn, will perform similar processing such that, once each of the QCSs 14-1-14-3 have modified the firewall rules and router rules, and performed any other suitable processing, the QCSs 14-1-14-3 have communications channels that facilitate communications between each other.

The distributed QCS generator 20 sends a message to the QCS 14-2 indicating that the QCS 14-2 is a following, or secondary, QCS 14 in a newly formed distributed QCS DQCS_1, that the QCS 14-1 is the primary QCS 14 in the distributed QCS DQCS_1, that the qubit 34-2-1 implemented by the QCS 14-2 is in the distributed QCS DQCS_1 and is now controlled by the QCS 14-1. The message may also include connection information relating to desired connections to utilize between the QCS 14-2 and the QCSs 14-1 and 14-3, and authentication information necessary to establish such connections.

The QCS 14-2 receives the message and modifies the qubit metadata 60-2 to identify the qubit 34-2-1 as now being unavailable for allocation and belonging to the distributed QCS DQCS_1. The QCS 14-2 generates role data 86 that indicates that the QCS 14-2 is a secondary QCS 14 in the distributed QCS DQCS_1. The connection service 72-2 may modify firewall rules and routing rules and perform any other processing suitable to allow communications associated with the distributed QCS DQCS_1 between the QCSs 14-1, 14-2 and 14-3. The designation of the qubit 34-2-1 as belonging to the distributed QCS DQCS_1, and the designation of the QCS 14-2 as a secondary QCS 14 results in the QCS 14-2 proxying any requests associated with the qubit 34-2-1 to the QCS 14-1. For example, if a quantum process executing on the QCS 14-2 requests from the QCS 14-2 any information about the qubit 34-2-1, the QCS 14-2 sends the request to the QCS 14-1. The QCS 14-1 receives the request, accesses the qubit metadata 60-1, and sends a response to the request to the QCS 14-2. The QCS 14-2 then provides the response to the quantum process that requested the process.

In a similar manner, the distributed QCS generator 20 sends a message to the QCS 14-3 indicating that the QCS 14-3 is a following, or secondary, QCS 14 in a newly formed distributed QCS DQCS_1, that the QCS 14-1 is the primary QCS 14 in the distributed QCS DQCS_1, that the qubits 34-3-1 and 34-3-2 implemented by the QCS 14-3 is in the distributed QCS DQCS_1 and are now controlled by the QCS 14-1. The message may also include connection information relating to desired connections to utilize between the QCS 14-3 and the QCSs 14-1 and 14-2, and authentication information necessary to establish such connections.

The QCS 14-3 receives the message and modifies the qubit metadata 60-3 to identify the qubits 34-3-1 and 34-3-2 as now being unavailable for allocation, and belonging to the distributed QCS DQCS_1. The QCS 14-3 generates role data 88 that indicates that the QCS 14-3 is a secondary QCS 14 in the distributed QCS DQCS_1. The connection service 72-3 may modify firewall rules and routing rules and perform any other processing suitable to allow communications associated with the distributed QCS DQCS_1 between the QCSs 14-1, 14-2 and 14-3. The designation of the qubits 34-3-1 and 34-3-2 as belonging to the distributed QCS DQCS_1, and the designation of the QCS 14-3 as a secondary QCS 14 results in the QCS 14-3 proxying any requests associated with the qubits 34-3-1 and 34-3-2 to the QCS 14-1.

Figure 2:
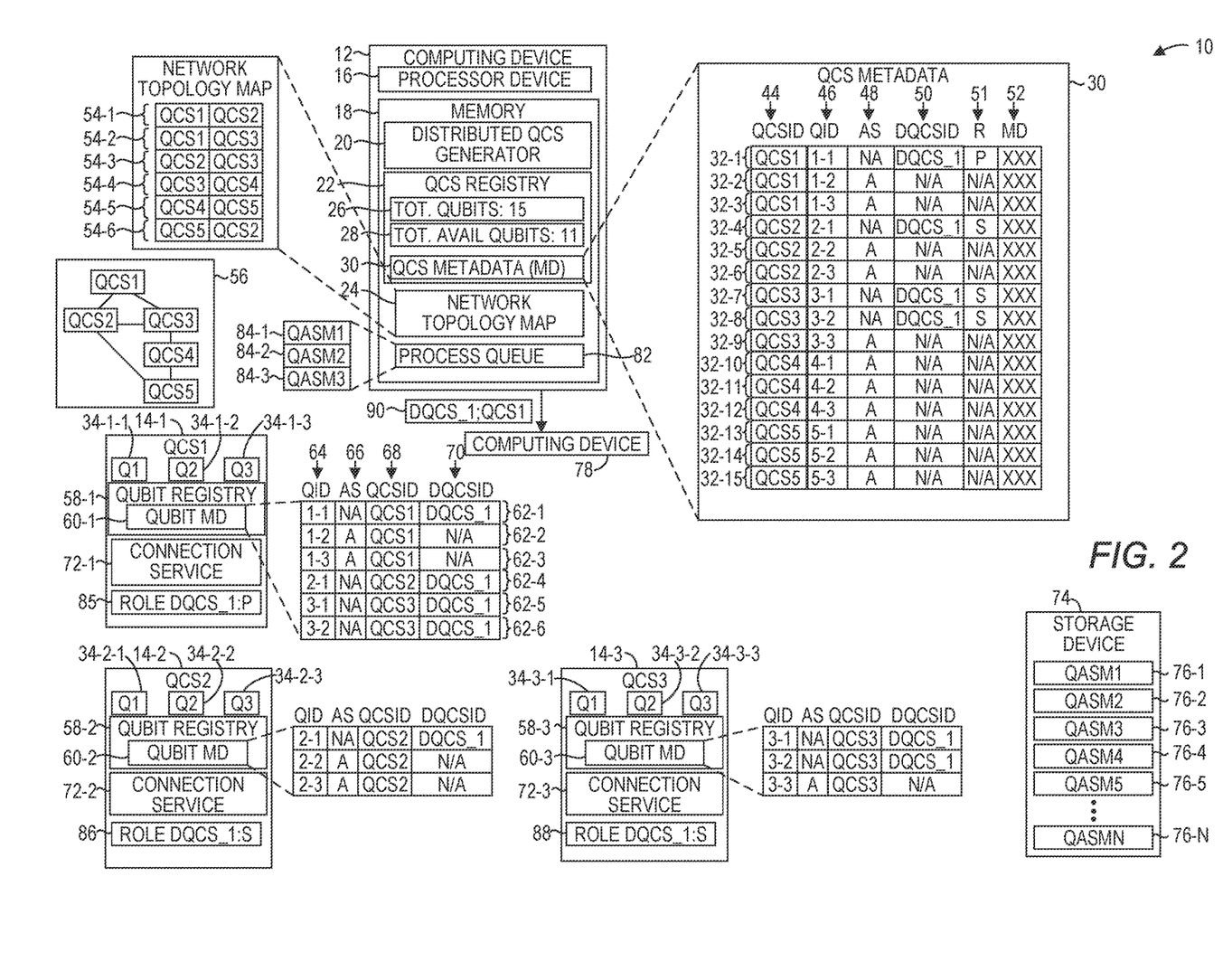
FIG. 2 is a block diagram of the environment illustrated in FIGS. 1A-1B illustrating a determination that a quantum process is to be initiated according to one implementation.

The distributed QCS generator 20 may now cause the initiation of a quantum process in the distributed QCS DQCS_1. Referring now to FIG. 2, in one implementation the distributed QCS generator 20 may send a message 90 to the requestor, in this example the computing device 78, that identifies the distributed QCS DQCS_1, and the QCS 14-1 as the primary QCS 14-1. The computing device 78 may then direct the QCS 14-1 to initiate a quantum process from the QASM file 76-1 in the distributed QCS DQCS_1. The QCS 14-1 accesses the QASM file 76-1 and initiates a quantum process from the QASM file 76-1. Requests for qubits 34 by the quantum process will cause the QCS 14-1 to utilize the qubits 34 allocated to the distributed QCS DQCS_1. The QCS 14-1 provides the appropriate locations/addresses of the qubits 34-1-1, 34-2-1, 34-3-1 and 34-3-2 to the quantum process. Communications between the QCS 14-1 and the QCSs 14-2 and 14-3 are implemented via the connection services 72-1-72-3.

Figure 3A:
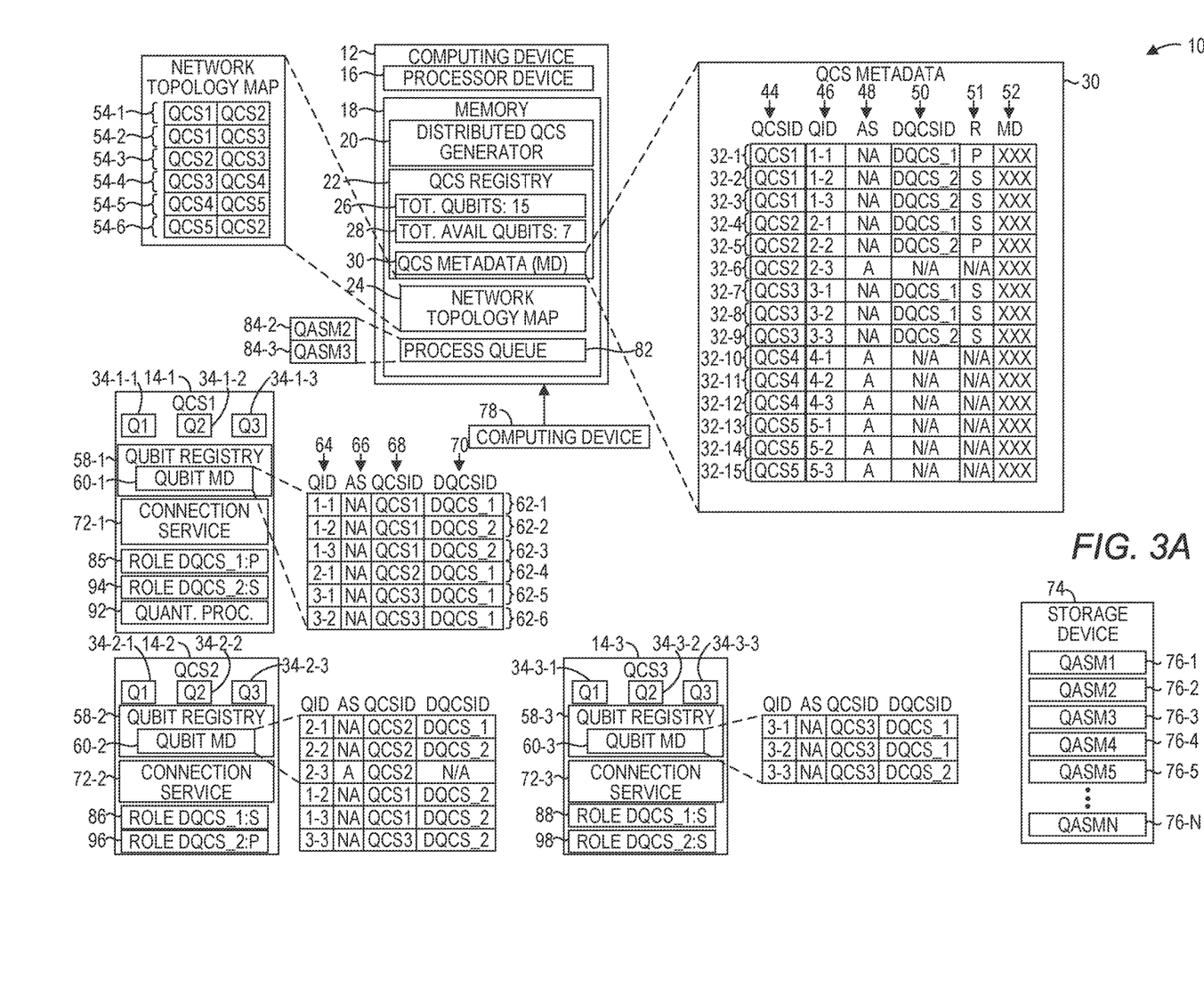
FIGS. 3A-3B are block diagrams of the environment illustrated in FIGS. 1A-1B illustrating a determination that a quantum process is to be initiated according to another implementation, and illustrating a termination of a distributed QCS.

Referring now to FIG. 3A, in another implementation wherein the distributed QCS generator 20 forms the distributed QCS DQCS_1 in response to requests in the process queue 82, the distributed QCS generator 20 causes the initiation of the quantum process in the distributed QCS DQCS_1 by directing the QCS 14-1 to initiate a quantum process from the QASM file 76-1 in the distributed QCS DQCS_1. The QCS 14-1 accesses the QASM file 76-1 and initiates a quantum process 92 from the QASM file 76-1. Requests for qubits 34 by the quantum process will cause the QCS 14-1 to utilize the qubits 34 allocated to the distributed QCS DQCS_1. The QCS 14-1 provides the appropriate locations/addresses of the qubits 34-1-1, 34-2-1, 34-3-1 and 34-3-2 to the quantum process. Communications between the QCS 14-1 and the QCSs 14-2 and 14-3 are implemented via the connection services 72-1-72-3.

Concurrently, while the quantum process 92 is executing on the QCS 14-1 in the distributed QCS DQCS_1, the distributed QCS generator 20 may remove the request 84-1 from the process queue 82 and access the next request 84-2. The distributed QCS generator 20 determines that a quantum process is to be initiated from the QASM file 76-2. Assume that the distributed QCS generator determines that the quantum process will utilize 12 qubits. The distributed QCS generator 20 accesses the QCS metadata 30. The distributed QCS generator 20 determines that, because four qubits 34 are currently allocated to the distributed QCS DQCS_1, the QCSs 14-1-14-5 do not have 12 available qubits. The distributed QCS generator 20 accesses the next request 84-3. The distributed QCS generator 20 determines that a quantum process is to be initiated from the QASM file 76-3. Assume that the distributed QCS generator 20 determines that the quantum process will utilize 4 qubits. The distributed QCS generator 20 accesses the QCS metadata 30. The distributed QCS generator 20 selects a set of QCSs 14 to form another distributed QCS, and another set of qubits 34 implemented by the set of QCSs 14. In this example the distributed QCS generator 20 selects the QCSs 14-1-14-3 and the qubits 34-1-2, 34-1-3, 34-2-2 and 34-3-3 to form a distributed QCS DQCS_2. The distributed QCS generator 20 selects the QCS 14-2 to be the controlling, or primary, QCS 14, and the QCSs 14-1 and 14-3 to be following, or secondary, QCSs 14.

The distributed QCS generator 20 modifies the QCS metadata 30 to identify the QCSs 14 in the distributed QCS DQCS_2. In particular, the distributed QCS generator 20 modifies the metadata records 32-2, 32-3, 32-5 and 32-9, which correspond, respectively, to the qubits 34-1-2, 34-1-3, 34-2-2 and 34-3-3. The distributed QCS generator 20 modifies the AS 48 of the metadata records 32-2, 32-3, 32-5 and 32-9 to indicate that the qubits 34-1-2, 34-1-3, 34-2-2 and 34-3-3 are no longer available for allocation, and modifies the DQCSID 50 to indicate that the qubits 34-1-2, 34-1-3, 34-2-2 and 34-3-3 have been allocated to the distributed QCS DQCS_2. The distributed QCS generator modifies the R 51 of the metadata record 32-5 to indicate that the QCS 14-2 has a role of a primary QCS 14 and modifies the R 51 of the metadata records 32-2, 32-3 and 32-9 to indicate that the QCSs 14-1 and 14-3 have a role of secondary QCSs 14. The distributed QCS generator 20 sends distributed QCS information, as described above, to the QCSs 14-1, 14-2 and 14-3 to establish the distributed QCS DQCS_2 on the QCSs 14-1, 14-2 and 14-3.

The QCS 14-1 receives the distributed QCS information and modifies the qubit metadata 60-1 to indicate that the qubits 34-1-2 and 34-1-3 have been allocated to the distributed QCS DQCS_2 and are no longer available for allocation. The QCS 14-1 generates role data 94 that indicates that the QCS 14-1 is a secondary QCS 14 in the distributed QCS DQCS_2. The QCS 14-2 receives the distributed QCS information and modifies the qubit metadata 60-2 to indicate that the qubit 34-2-2 has been allocated to the distributed QCS DQCS_2 and is no longer available for allocation. The QCS 14-2 generates new entries in the qubit metadata 60-2 that corresponds to the qubits 34-1-2, 34-1-3 and 34-3-3 to reflect that the qubits 34-1-2, 34-1-3 and 34-3-3 are part of the distributed QCS DQCS_2. The QCS 14-2 generates role data 96 that indicates that the QCS 14-2 is the primary QCS 14 in the distributed QCS DQCS_2. The QCS 14-3 receives the distributed QCS information and modifies the qubit metadata 60-3 to indicate that the qubit 34-3-3 has been allocated to the distributed QCS DQCS_2 and is no longer available for allocation. The QCS 14-3 generates role data 98 that indicates that the QCS 14-3 is a secondary QCS 14 in the distributed QCS DQCS_2. The connection services 72-1-72-3 establish connections, as discussed above, for communication between the QCSs 14-1-14-3 for the distributed QCS DQCS_2.

In this manner, the distributed QCS generator 20 may process the queued requests 84 to establish as many distributed QCSs as can be established with available qubits 34 to facilitate concurrent and parallel execution of as many quantum processes as possible over the QCSs 14-1-14-5.

Figure 3B:
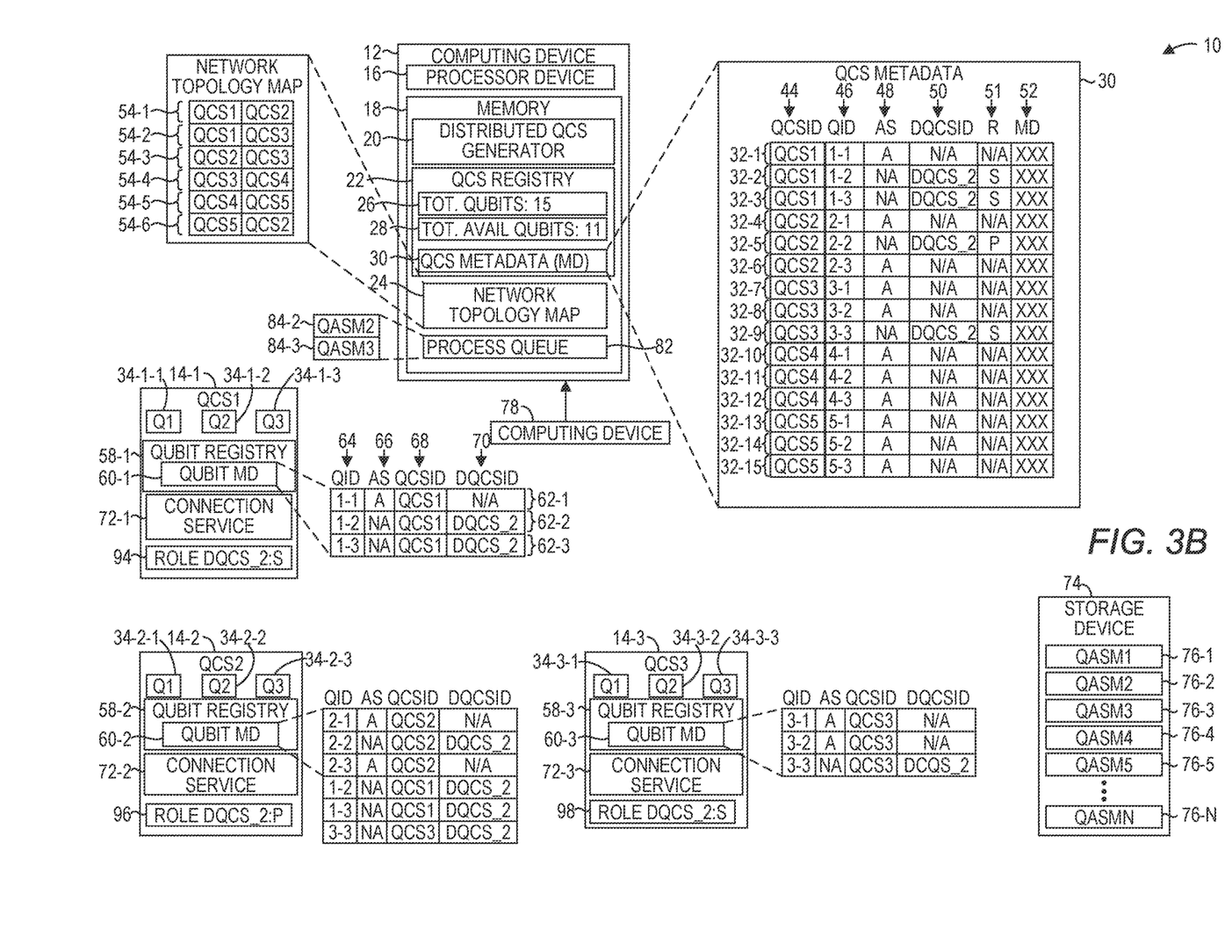

After the quantum process 92 terminates, the QCS 14-1 may communicate a message to the computing device 12 informing the computing device 12 of the termination of the quantum process 92. The distributed QCS generator 20 thus determines that the quantum process 92 has terminated, and sends termination information to the QCSs 14-1, 14-2 and 14-3 informing the QCSs 14-1, 14-2 and 14-3 that the first distributed QCS DQCS_1 has terminated. Referring now to FIG. 3B, the distributed QCS generator 20 modifies the QCS metadata 30 to identify the qubits 34-1-1, 34-2-1, 34-3-1 and 34-3-2 as no longer being allocated to the distributed QCS DQCS_1. In particular, the distributed QCS generator 20 modifies the AS 48 of the metadata records 32-1, 32-4, 32-7 and 32-8 to indicate that the qubits 34-1-1, 34-2-1, 34-3-1 and 34-3-2 are now available for allocation, and modifies the DQCSID 50 to indicate that the qubits 34-1-1, 34-2-1, 34-3-1 and 34-3-2 are not allocated to a distributed QCS. The distributed QCS generator 20 modifies the R 51 of the metadata records 32-1, 32-4, 32-7 and 32-8 to indicate that the role is no longer applicable.

The QCS 14-1 receives the termination information and modifies the qubit metadata 60-1 to remove the entries 62-4-62-6 that corresponded to the qubits 34-2-1, 34-3-1 and 34-3-2. The QCS 14-1 modifies the entry 62-1 to indicate that the qubit 34-1-1 is no longer allocated to the distributed QCS DQCS_1. The QCSs 14-2 and 14-3 receive the termination information and make similar modifications to reflect that the corresponding qubits 34-2-1, 34-3-1 and 34-3-2 are no longer allocated to the distributed QCS DQCS_1 and are now available for allocation. The connection services 72-1-72-3 tear down the connections established for the distributed QCS DQCS_1 and restore appropriate firewall settings and the like.

Figure 4:
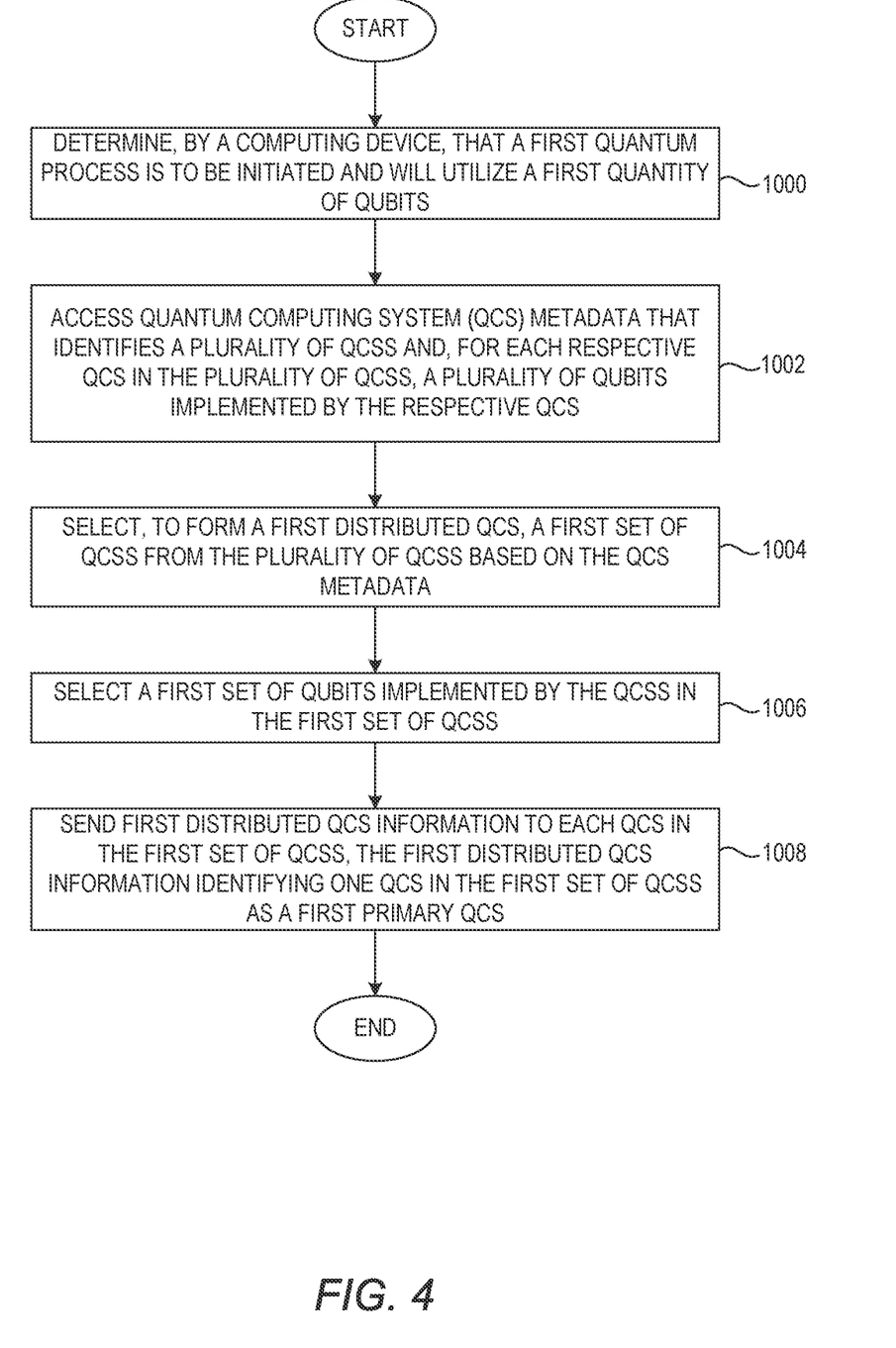
FIG. 4 is a flowchart of a method for implementing a distributed QCS according to one implementation.

FIG. 4 is a flowchart of a method for implementing a distributed QCS according to one implementation. FIG. 4 will be discussed in conjunction with FIGS. 1A-1B. The computing device 12 determines that a quantum process is to be initiated and will utilize a first quantity of the qubits 34 (FIG. 4, block 1000). The computing device 12 accesses the QCS metadata 30 that identifies the plurality of QCSs 14-1-14-5 and, for each respective QCS 14 in the plurality of QCSs 14, a plurality of qubits 34 implemented by the respective QCS 14 (FIG. 4, block 1002). The computing device 12 selects, to form the distributed QCS DOCS_1, a set of QCSs 14-1-14-3 from the plurality of QCSs 14-1-14-5 based on the QCS metadata 30 (FIG. 4, block 1004). The computing device 12 selects the set of qubits 34-1-1, 34-2-1, 34-3-1 and 34-3-2, implemented by the QCSs 14 in the set of QCSs 14-1-14-3 (FIG. 4, block 1006). The computing device 12 sends distributed QCS information to each QCS 14 in the set of QCSs 14-1-14-3, the distributed QCS information identifying the QCS 14-1 in the set of QCSs 14-1-14-3 as the primary QCS 14 (FIG. 4, block 1008).

Figure 5:
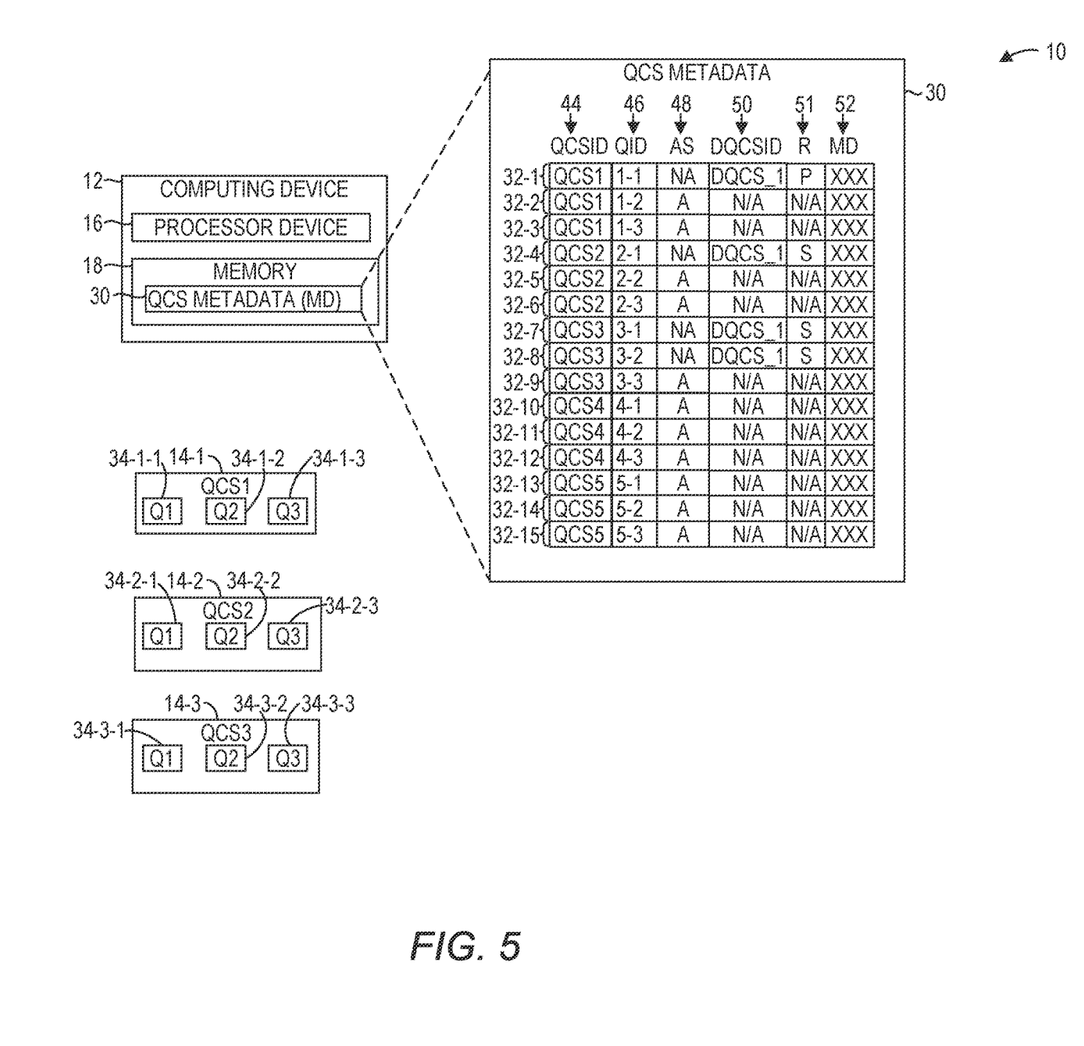
FIG. 5 is a simplified block diagram of the environment illustrated in FIGS. 1A-1B according to one implementation.

FIG. 5 is a simplified block diagram of the environment 10 illustrated in FIGS. 1A-1B according to one implementation. The environment 10 includes the computing device 12, which in turn includes the memory 18 and the processor device 16 coupled to the memory 18. The processor device 16 is to determine that a quantum process is to be initiated and will utilize a quantity of qubits 34. The processor device 16 is further to access the QCS metadata 30 that identifies the plurality of QCSs 14-1-14-5 and, for each respective QCS 14 in the plurality of QCSs 14, the plurality of qubits 34 implemented by the respective QCS 14. The processor device 16 is further to select, to form the distributed QCS DQCS_1, the set of QCSs 14-1-14-3 from the plurality of QCSs 14-1-14-5 based on the QCS metadata 30. The processor device 16 is further to select the set of qubits 34-1-1, 34-2-1, 34-3-1 and 34-3-2 implemented by the QCSs 14-1-

14-3 in the set of QCSs 14. The processor device 16 is further to send distributed QCS information to each QCS 14 in the set of QCSs 14-1-14-3, the distributed QCS information identifying the QCS 14-1 in the set of QCSs 14-1-14-3 as the primary QCS 14.

Figure 6:
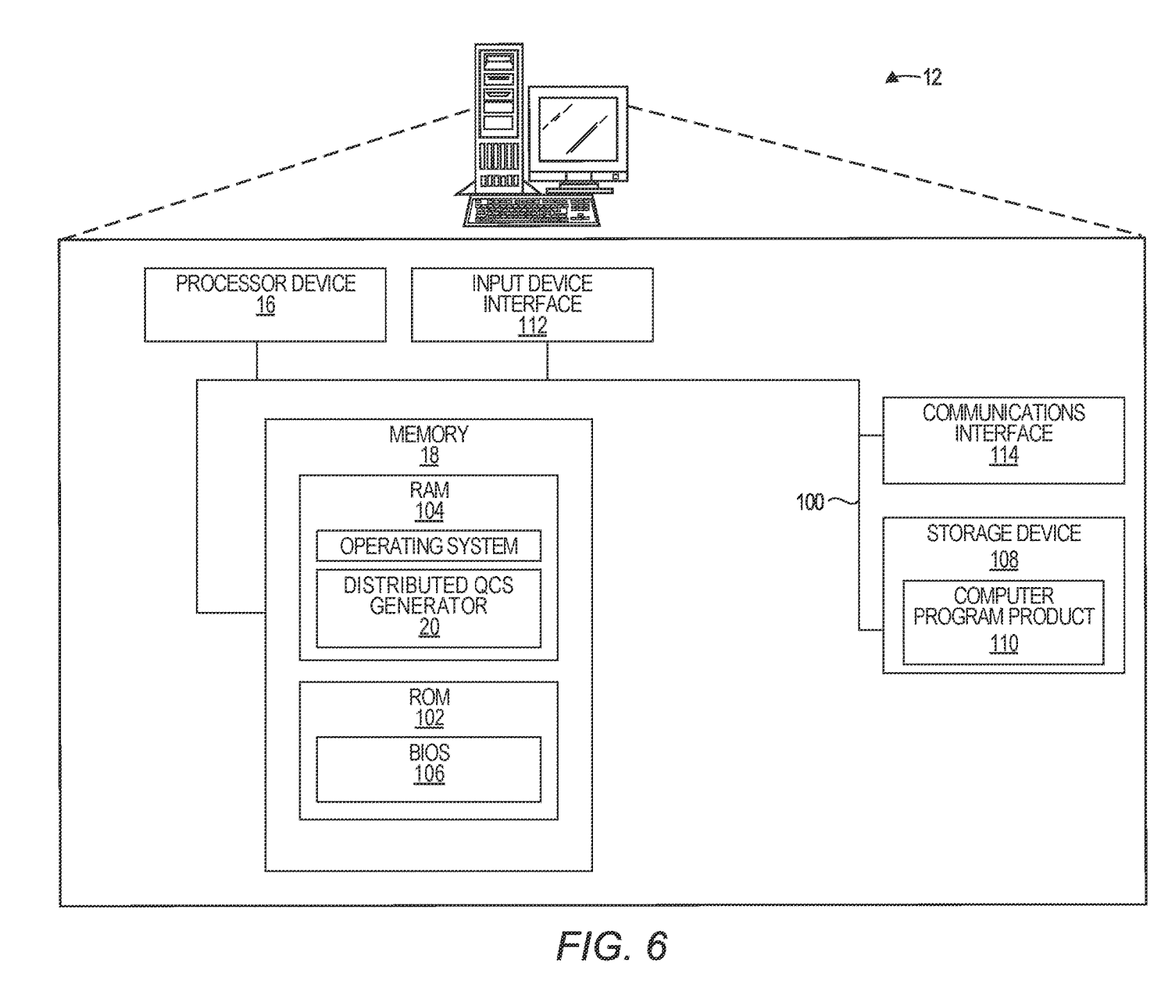
FIG. 6 is a block diagram of a computing device suitable for implementing examples according to one example.

FIG. 6 is a block diagram of the computing device 12 suitable for implementing examples according to one example. The computing device 12 may comprise any quantum computing device, classical computing device, or other electronic device capable of including firmware, hardware, and/or executing software instructions to implement the functionality described herein, such as a computer server, a desktop computing device, a laptop computing device, or the like. The computing device 12 includes the processor device 16, the system memory 18, and a system bus 100. The system bus 100 provides an interface for system components including, but not limited to, the system memory 18 and the processor device 16. The processor device 16 can be any commercially available or proprietary processor.

The system bus 100 may be any of several types of bus structures that may further interconnect to a memory bus (with or without a memory controller), a peripheral bus, and/or a local bus using any of a variety of commercially available bus architectures. The system memory 18 may include non-volatile memory 102 (e.g., read-only memory (ROM), erasable programmable read-only memory (EPROM), electrically erasable programmable read-only memory (EEPROM), etc.), and volatile memory 104 (e.g., random-access memory (RAM)). A basic input/output system (BIOS) 106 may be stored in the non-volatile memory 102 and can include the basic routines that help to transfer information between elements within the computing device 12. The volatile memory 104 may also include a high-speed RAM, such as static RAM, for caching data.

The computing device 12 may further include or be coupled to a non-transitory computer-readable storage medium such as a storage device 108, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 108 and other drives associated with computer-readable media and computer-usable media may provide non-volatile storage of data, data structures, computer-executable instructions, and the like.

A number of modules can be stored in the storage device 108 and in the volatile memory 104, including an operating system and one or more program modules, such as the distributed QCS generator 20, which may implement the functionality described herein in whole or in part. All or a portion of the examples may be implemented as a computer program product 110 stored on a transitory or non-transitory computer-usable or computer-readable storage medium, such as the storage device 108, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the distributed QCS generator 20 in the volatile memory 104, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 112 that is coupled to the system bus 100 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 114 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a computing device, that a first quantum process is to be initiated and will utilize a first quantity of qubits;
   accessing quantum computing system (QCS) metadata that identifies a plurality of QCSs and, for each respective QCS in the plurality of QCSs, a plurality of qubits implemented by the respective QCS;
   selecting, to form a first distributed QCS, a first set of QCSs from the plurality of QCSs based on the QCS metadata;
   selecting a first set of qubits implemented by the QCSs in the first set of QCSs; and
   sending first distributed QCS information to each QCS in the first set of QCSs, the first distributed QCS information identifying one QCS in the first set of QCSs as a first primary QCS.

2. The method of claim 1 further comprising causing an initiation of the first quantum process on the first primary QCS.

3. The method of claim 1 wherein determining that the first quantum process is to be initiated and will utilize the first quantity of qubits comprises:
   receiving a request from a requestor that identifies the first quantum process and the first quantity of qubits; and
   sending, to the requestor, information that identifies the first primary QCS.

4. The method of claim 1 further comprising:
   determining, by the computing device, that a second quantum process is to be initiated and will utilize a second quantity of qubits;
   accessing the QCS metadata;
   selecting, to form a second distributed QCS, a second set of QCSs from the plurality of QCSs based on the QCS metadata;
   selecting a second set of qubits implemented by the QCSs in the second set of QCSs, the second set of qubits comprising different qubits than the qubits in the first set of qubits; and
   sending second distributed QCS information to each QCS in the second set of QCSs, the second distributed QCS information identifying one QCS in the second set of QCSs as a second primary QCS, and information that identifies those qubits implemented by each QCS in the second set of qubits.

5. The method of claim 1 further comprising accessing topology information that identifies connections between pairs of the plurality of QCSs; and wherein selecting the first set of QCSs from the plurality of QCSs based on the QCS metadata further comprises selecting the first set of QCSs from the plurality of QCSs based on the QCS metadata and based on the topology information.

6. The method of claim 5 wherein selecting the first set of QCSs from the plurality of QCSs based on the QCS metadata and based on the topology information further comprises:
selecting the first set of QCSs based at least in part on determining, based on the topology information, that each QCS in the first set of QCSs has a connection with at least one other QCS in the first set of QCSs.

7. The method of claim 6 wherein each connection comprises a quantum communications channel.

8. The method of claim 1 further comprising sending, to each respective QCS in the first set of QCSs, connection information that identifies a connection between the respective QCS and at least one other QCS in the first set of QCSs.

9. The method of claim 1 further comprising modifying the QCS metadata to identify the QCSs in the first set of QCSs as forming the first distributed QCS.

10. The method of claim 1 further comprising modifying the QCS metadata to identify each qubit in the first set of qubits as being allocated to the first distributed QCS.

11. The method of claim 1 further comprising:
determining, by the computing device, that the first quantum process has terminated; and
sending termination information to each respective QCS in the first set of QCSs informing the respective QCS that the first distributed QCS is terminated.

12. The method of claim 11 further comprising modifying the QCS metadata to identify each qubit in the first set of qubits as no longer being allocated to the first distributed QCS.

13. The method of claim 1 wherein determining, by the computing device, that the first quantum process is to be initiated and will utilize the first quantity of qubits comprises accessing a queue that identifies a plurality of quantum processes to be initiated.

14. The method of claim 1 wherein determining that the first quantum process will utilize the first quantity of qubits further comprises:
determining a quantum assembly language (QASM) file that implements the first quantum process; and
analyzing the QASM file to determine the first quantity of qubits to be utilized by the first quantum process.

15. The method of claim 1 wherein the first distributed QCS information includes information that identifies those qubits implemented by each QCS in the first set of QCSs.

16. A computing device, comprising:
a memory; and
a processor device coupled to the memory to:
determine that a first quantum process is to be initiated and will utilize a first quantity of qubits;
access quantum computing system (QCS) metadata that identifies a plurality of QCSs and, for each respective QCS in the plurality of QCSs, a plurality of qubits implemented by the respective QCS;
select, to form a first distributed QCS, a first set of QCSs from the plurality of QCSs based on the QCS metadata;
select a first set of qubits implemented by the QCSs in the first set of QCSs; and
send first distributed QCS information to each QCS in the first set of QCSs, the first distributed QCS information identifying one QCS in the first set of QCSs as a first primary QCS.

17. The computing device of claim 16 wherein the processor device is further to:
determine that a second quantum process is to be initiated and will utilize a second quantity of qubits;
access the QCS metadata;
select a second set of QCSs from the plurality of QCSs based on the QCS metadata, the second set of QCSs to form a second distributed QCS;
select a second set of qubits implemented by the QCSs in the second set of QCSs, the second set of qubits comprising different qubits than the qubits in the first set of qubits; and
send second distributed QCS information to each QCS in the second set of QCSs, the second distributed QCS information identifying one QCS in the second set of QCSs as a second primary QCS, and information that identifies those qubits implemented by each QCS in the second set of qubits.

18. The computing device of claim 16 wherein to determine that the first quantum process will utilize the first quantity of qubits, the processor device is further to:
determine a quantum assembly language (QASM) file that implements the first quantum process; and
analyze the QASM file to determine the first quantity of qubits to be utilized by the first quantum process.

19. A non-transitory computer-readable storage medium that includes executable instructions configured to cause a processor device to:
determine that a first quantum process is to be initiated and will utilize a first quantity of qubits;
access quantum computing system (QCS) metadata that identifies a plurality of QCSs and, for each respective quantum computing system (QCS) in the plurality of QCSs, a plurality of qubits implemented by the respective QCS;
select, to form a first distributed QCS, a first set of QCSs from the plurality of QCSs based on the QCS metadata;
select a first set of qubits implemented by the QCSs in the first set of QCSs; and
send first distributed QCS information to each QCS in the first set of QCSs, the first distributed QCS information identifying one QCS in the first set of QCSs as a first primary QCS.

20. The non-transitory computer-readable storage medium of claim 19 wherein the instructions further cause the processor device to:
determine that a second quantum process is to be initiated and will utilize a second quantity of qubits;
access the QCS metadata;
select a second set of QCSs from the plurality of QCSs based on the QCS metadata, the second set of QCSs to form a second distributed QCS;
select a second set of qubits implemented by the QCSs in the second set of QCSs, the second set of qubits comprising different qubits than the qubits in the first set of qubits; and
send second distributed QCS information to each QCS in the second set of QCSs, the second distributed QCS information identifying one QCS in the second set of QCSs as a second primary QCS, and information that identifies those qubits implemented by each QCS in the second set of qubits.

* * * * *